Aug. 8, 1933.  D. B. FOUST  1,921,406
POWER TRANSMISSION MECHANISM
Filed Aug. 12, 1932  2 Sheets-Sheet 1

INVENTOR
Donald B. Foust
BY Darby + Darby
ATTORNEYS

UNITED STATES PATENT OFFICE 1,921,406

POWER TRANSMISSION MECHANISM

Donald B. Foust, Bethlehem, Pa.

Application August 12, 1932. Serial No. 628,535

8 Claims. (Cl. 74—7)

This invention relates to improvements in power transmission mechanism, particularly of the type employed as the differential of an automobile.

One of the objects of this invention is to provide an improved form of a power transmission device in a form of an automobile differential.

Another object of this invention is to provide an improved simplified structure of this nature in which the driven wheels of the vehicle are operated by means of a positive drive.

A further object of this invention is to provide in such a differential structure what may be termed a "differential clutch" which operates automatically to supply power to one of the wheels, even if the other is slipping.

A further object of this invention is to provide in a differential an overrunning clutch mechanism to permit of so-called "free-wheeling".

A still further object of this invention is to provide control mechanism for locking the overrunning clutches into positive connection for conventional drive.

These and many other objects, as will appear from the following disclosure, are secured by means of this invention.

This invention resides substantially in the combination, construction, arrangement and relative location of parts, all as will be more fully pointed out hereinafter.

Referring to the drawings—

Figure 1:
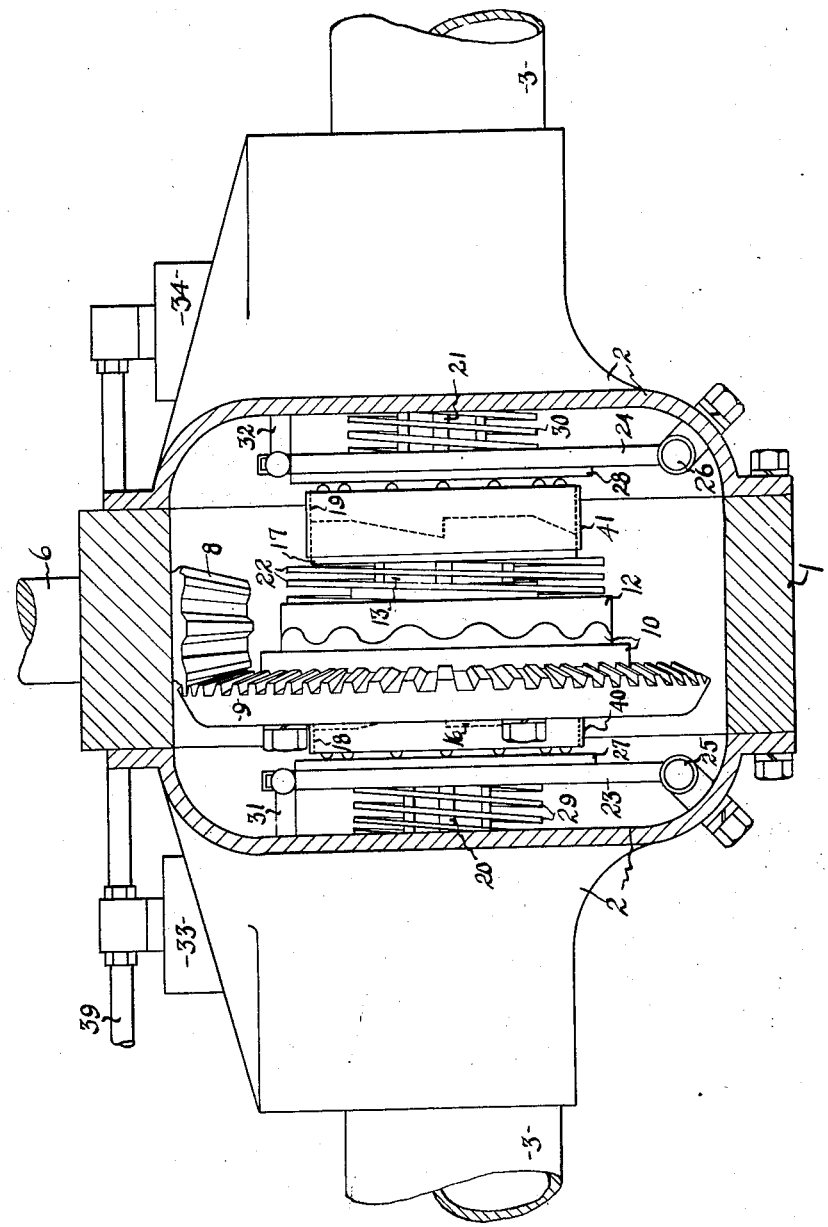
Figure 1 is a side elevational view of the device showing the casing in vertical cross-section.
Figure 2:
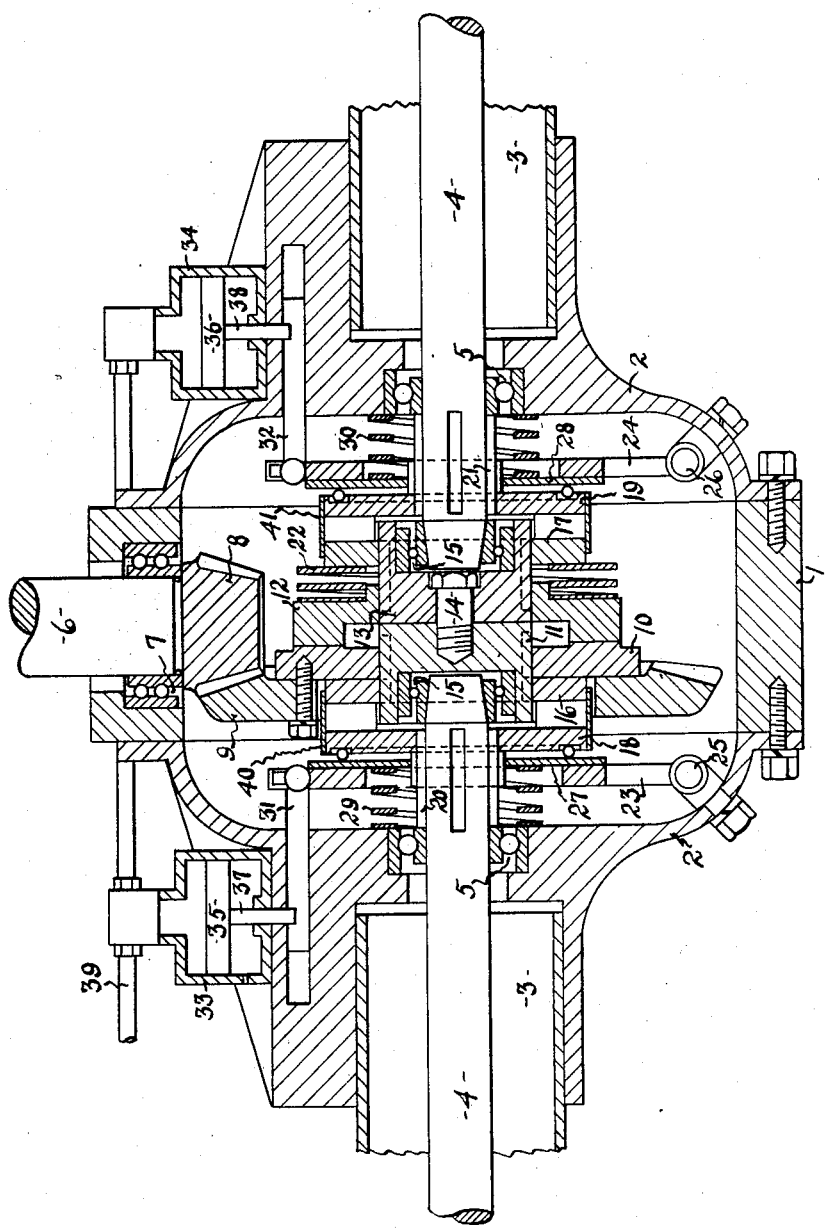
Fig. 2 is a central longitudinal vertical cross-sectional view through the mechanism of this invention.

This invention involves a simplified structure of differential power transmission mechanism for vehicles in which all of the usual advantages of the common differential are attained. In addition, a positive drive to the driving axis of the vehicle is provided. The device is so constructed that even if there is an absence of traction at one wheel, power is delivered to the other wheel. One feature of this mechanism is that the two halves of the axle are connected by a spring-engaged clutch constructed so that it may slip whenever necessary to provide differential action, either under normal or abnormal operating conditions. The mechanism, furthermore, involves overrunning clutch mechanisms which, when unlocked, permit of the so-called "free-wheeling" feature, wherein when the engine is idling and the vehicle is running fast the engine is disconnected from the driving wheels. A control mechanism is provided for either locking the overrunning clutches into positive connection, or for releasing them when desired. All of this mechanism is embodied in a simple unitary structure, all within the usual differential casing and adapted for use either for front or rear vehicle drive.

The invention will now be described in detail in connection with the drawings. As shown, the casing comprises a central ring shaped member 1 to the sides of which are bolted or secured the cover plates 2 which, united with the ring, form a closed housing. The cover plates are provided with integral hubs in which are nested the tubes 3 through which the axles 4 extend. The axles are journaled in these hubs in suitable bearings, such as the ball bearings 5.

At 6 is the transmission shaft which projects into the casing and is provided with a drive gear 8. The shaft 6 is journaled adjacent the gear in the ball bearings 7. The gear 8, which is shown in the form of a bevel gear, meshes with the ring gear 9 which is bolted to one member 10 of the differential clutch. This member 10 is keyed to and for rotation with a cylindrical floating bearing member 11. This member is secured to a similar member 13 by means of a bolt 14 so that the members 11 and 13 form together a floating axle bearing center which is rotatably supported on the ends of the axles 4 by means of ball bearings 15. Thus, the floating axle bearing member comprising the parts 11 and 13 is supported solely by the inner ends of the shafts 4 and is mounted for free rotation thereon. As previously stated, the ring gear 9 is securely bolted to one part 10 of the differential clutch which, in turn, is keyed to the member 11. The complementary clutch element 12 of the differential clutch is keyed to the member 13.

The free-wheeling clutches comprise interengaging clutch parts 16 and 18 and 17 and 19 respectively. The disks 16 and 17 of these free-wheeling clutches are keyed to the members 11 and 13 respectively. The complementary disks 18 and 19 of the free-wheeling clutches are keyed to the axles 4 by means of keys 20 and 21. Interposed between the righthand disk of the differential clutch and the lefthand disk of the righthand free-wheeling clutch is a suitably proportioned spring 22 which normally causes and maintains the differential clutch in engagement.

At 23 and 24 are suitably shaped lever arms which are pivotally mounted at their lower ends on the studs 25 and 26. These lever arms are so constructed that they pass around the axles 4 and the interposed mechanism. Secured on the inner faces of these levers are the bearing disks 27 and 28 which form a race for the ball bearings interposed between them and the free-wheeling clutch disks 18 and 19. At 29 and 30 are springs which encircle the axle 4 and are interposed between the casing and the disks 27 and 28 respectively. Pivotally connected to the upper end of the lever arms 23 and 24 are the rods 31 and 32 which are longitudinally slidable and recessed in the hubs of the cover plates. Mounted on these hubs are small cylinders 33 and 34 in which the pistons 35 and 36 operate. The piston rods 37 and 38 project downwardly into the recesses and into contact with the rods 31 and 32 which are notched at the proper points to receive the ends of the piston rods and lock the parts in the positions shown in the drawings. The pipe 39 is provided for supplying an exhaust pressure to and from the cylinders. As will be apparent, this pipe is controlled by a simple valve for connecting the pipe either to a fluid pressure or vacuum source or to the atmosphere. The form of mechanism disclosed is particularly adaptable for use with a vacuum source, such as that provided by the intake manifold of an internal combustion engine. Thus, when the control valve is set to connect pipe 39 to the vacuum source the pistons 35 and 36 will be raised by atmospheric pressure to unlock the rods 31 and 32 and hence to unlock the free-wheeling clutches. When the valve is operated to connect pipe 39 to the atmosphere the pistons will fall to locking position and may be aided in their movement by springs pressing on the top thereof if desirable.

The manner of operating this apparatus is, of course, apparent to those skilled in the art and need not be described in further detail since it is adapted to many forms. For example, the locks could just as well be operated by means of electro-magnets.

The free-wheeling clutches are surrounded by rings 40 and 41, as is clear from the drawings, for the purpose of reducing the noise of operation of the free-wheeling clutches which are, in a sense, in the form of interengaging ratchet wheels. These rings fit snugly around the free-wheeling clutches and are preferably secured to the outer portions 18 and 19 thereof so as to move therewith. Of course, the entire mechanism will run in grease so that as the ratchets 18 and 19 move outwardly from the center during overrunning action, the rings will move with them; and when they have moved sufficiently the space between the ratchet wheels will be open and grease can enter. On the reverse movement the grease will be gradually forced out between the complementary ratchet wheels. Thus, the tendency to produce noise is reduced by reason of the oil cushion and by reason of at least the partial enclosure of the engaging surfaces which would produce the noise.

The operation of this device will now be described. The mechanism is shown in the drawings in the position for conventional drive with the free-wheeling clutches locked together. Power will then be delivered by shaft 6 and gear 8 to the ring gear 9. The rotation of the ring gear will cause the rotation of the elements 10, 11 and 16 because all these parts are secured and keyed together.

The lefthand axle will be operated by reason of the engagement of element 18 with element 16. In a like manner, element 12 which is in engagement with element 10 is keyed to element 13 and element 17. In turn, the element 17 is positively engaged with element 19 which is keyed to the righthand axle. Thus, for conventional drive both axles will be positively rotated. The normal direction of rotation of the parts will be such that in looking at the mechanism from the righthand end of either figure, the axles will be revolving in clockwise direction so that there is no tendency for the ratchets of the free-wheeling clutches to disengage. The righthand axle is, of course, only connected to the driving mechanism through the spring pressed differential clutch 13. Thus, the necessary differential action may readily occur whenever necessary, and in case one wheel is slipping power will be delivered to the other wheel, which is not true of the usual form of differential.

Thus, for conventional drive it will be apparent that power is transmitted equally to both axles while permitting of the necessary differential action resulting from wheel lag and insuring the arrival of power at at least one of the wheels under adverse road conditions such as loss of traction on one of the wheels.

For operation in free-wheeling, the locking devices are operated to release the rods 31 and 32 so that the ratchets of the free-wheeling clutches are only held in engagement by springs 29 and 30. In this position the necessary differential action may be secured as before, as well as proper operation under adverse road conditions.

In addition, free-wheeling is attained as will be apparent from the drawings. When the accelerator is released to permit the engine to idle, the fast running axles will be disconnected from the transmission by reason of the fact that the outer ratchet wheels 18 and 19 may rotate past their complementary ratchet wheels 16 and 17. In other words, for clockwise rotation again it will be apparent that if the axles are running faster than the transmission the ratchet wheels 18 and 19 will overrun. However, when the engine is actually driving the car the free-wheeling clutches will be in engagement and the differential clutch may then carry out its function of permitting differential action whenever necessary. In returning to conventional drive it is only necessary to operate the valves because of the locking devices to lock the free-wheeling clutches against disengagement. While the free-wheeling clutches are constructed to permit relative movement of the parts in one direction, the differential clutch is constructed to permit relative movement of the parts in either direction. This is effected, as will be apparent from the drawings, by providing the engaging faces of the clutch elements with smooth surface equally sized projections which are of the same configuration on each side of the center line of each projection. For example, the outline of the engaging faces approximates a sine curve, although it need not necessarily be limited to a sine curve form.

From the above description it will be apparent that I have embodied in a simple structure all of the advantages of the usual conventional differential drive and free-wheeling and, in addition, have provided a differential through which power may flow to one of the wheels, even though the other may be slipping. It will be apparent to those skilled in the art that this invention may be embodied in other physical forms without departure therefrom, and I do not therefore desire to be strictly limited to the disclosure as given in the specification and drawings for purposes of illustration, but rather to the scope of the appended claims.

What I seek to secure by United States Letters Patent is:

1. A mechanism as described comprising a pair of driven shafts, a driving shaft, means for directly connecting the driving shaft with one of the driven shafts, and a spring-pressed clutch for connecting the driven shafts together.

2. A transmission device as described comprising a support, a pair of driven shafts journaled in said support in longitudinal alignment, a driving shaft, a center floating bearing member rotatably journaled on the adjacent ends of the driven shafts, the bearing member comprising a pair of relatively movable members, a differential clutch having its complementary elements keyed to the members of the floating bearing member, means for resiliently engaging the members of the clutch, and means for connecting the driving shaft to one of the members of the clutch.

3. A power transmission mechanism as described comprising a support, a pair of aligned shafts journaled at adjacent ends in said support, a differential spring-engaged clutch connecting the driven shafts together, a driving shaft, means for connecting the driving shaft to said differential clutch, and a pair of overrunning clutches for connecting the differential clutch to the driven shafts.

4. A power transmission mechanism as described comprising a support, a pair of aligned shafts journaled at adjacent ends in said support, a differential spring-engaged clutch connecting the driven shafts together, a driving shaft, means for connecting the driving shaft to said differential clutch, a pair of overrunning clutches for connecting the differential clutch to the driven shafts, and means for locking the overrunning clutches in engaged position.

5. A power transmission mechanism comprising a pair of aligned driven shafts, a driving shaft, a spring-pressed differential clutch, means for driving the differential clutch from the driving shaft, spring means for resiliently holding the differential clutch in engagement, a pair of overrunning clutches each comprising a pair of engaging elements, means for connecting one element of each overrunning clutch to one of the elements of the differential clutch, means for connecting the other elements of the overrunning clutches to the driven shafts, and spring means for causing the elements of the overrunning clutches to engage.

6. A power transmission mechanism comprising a pair of aligned driven shafts, a driving shaft, a spring-pressed differential clutch, means for driving the differential clutch from the driving shaft, spring means for resiliently holding the differential clutch in engagement, a pair of overrunning clutches each comprising a pair of engaging elements, means for connecting one element of each overrunning clutch to one of the elements of the differential clutch, means for connecting the other elements of the overrunning clutches to the driven shafts, spring means for causing the elements of the overrunning clutches to engage, and means for locking the overrunning clutches in engaged position.

7. A power transmission mechanism comprising a pair of aligned driven shafts, a driving shaft, a spring-pressed differential clutch, means for driving the differential clutch from the driving shaft, spring means for resiliently holding the differential clutch in engagement, a pair of overrunning clutches each comprising a pair of engaging elements, means for connecting one element of each overrunning clutch to one of the elements of the differential clutch, means for connecting the other elements of the overrunning clutches to the driven shafts, spring means for causing the elements of the overrunning clutches to engage, and enclosing the casings for the overrunning clutches to minimize noise produced by their clashing.

8. A power transmission mechanism comprising a pair of aligned driven shafts, a driving shaft, a spring-pressed differential clutch, means for driving the differential clutch from the driving shaft, spring means for resiliently holding the differential clutch in engagement, a pair of overrunning clutches each comprising a pair of engaging elements, means for connecting one element of each overrunning clutch to one of the elements of the differential clutch, means for connecting the other elements of the overrunning clutches to the driven shafts, spring means for causing the elements of the overrunning clutches to engage, and fluid pressure operated locking devices for locking the overrunning clutches in engaged position.

DONALD B. FOUST.